June 17, 1930.  A. SLATEN  1,765,106
FAUCET
Filed Oct. 1, 1928
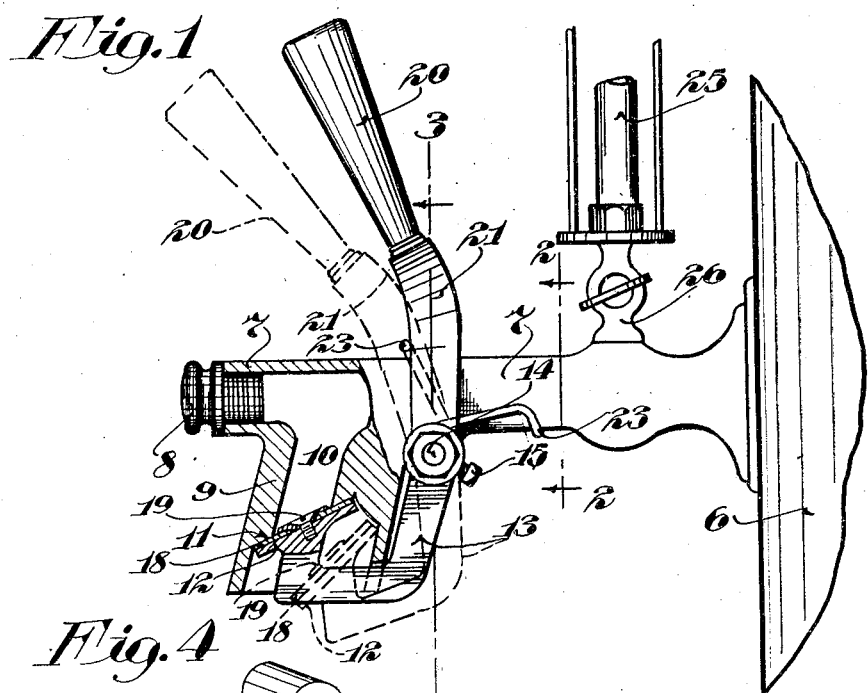
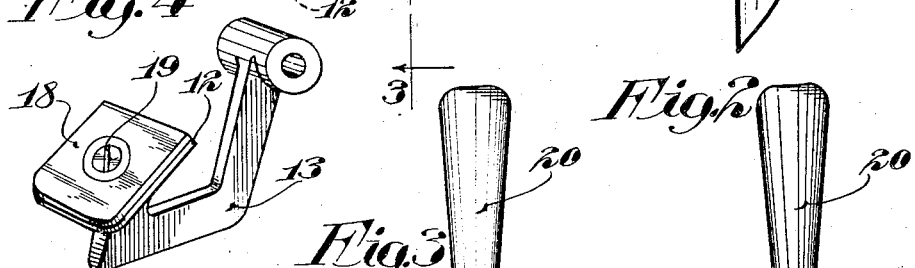
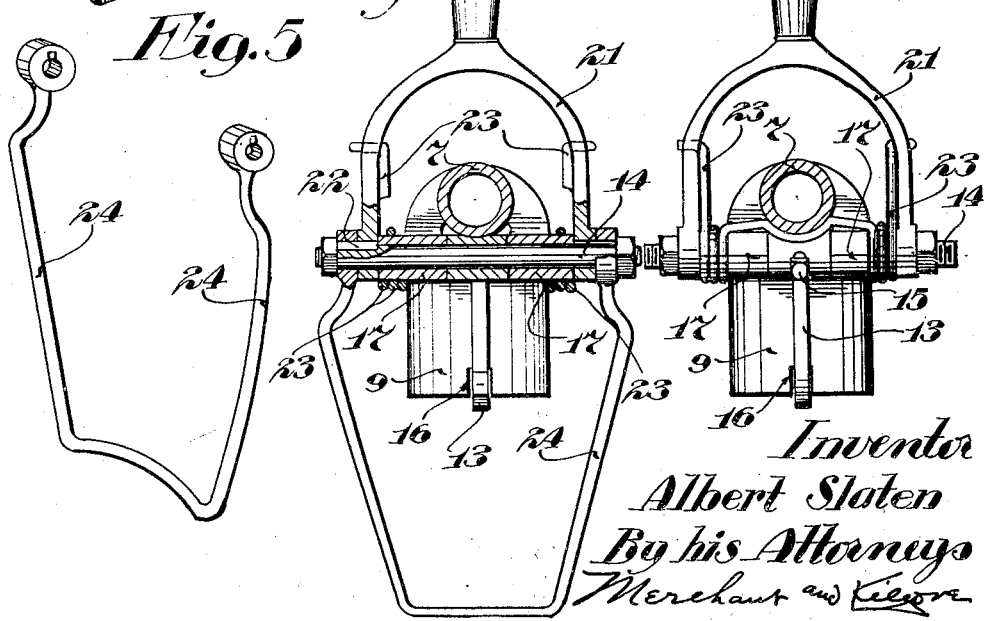
Inventor
Albert Slaten
By his Attorneys
Merchant and Kilgore Patented June 17, 1930

1,765,106

UNITED STATES PATENT OFFICE

ALBERT SLATEN, OF MINNEAPOLIS, MINNESOTA

FAUCET

Application filed October 1, 1928. Serial No. 309,418.

My present invention relates to faucets intended for general use in connection with coffee urns and the like and has for its object the provision of such a faucet that will not leak or drip, that is quick in its action and may be opened up to the full conducting capacity of the faucet by a relatively short movement of the operating connection therefor and in which the movable parts of the faucet are not subject to a great deal of wear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view of a coffee urn to which the improved faucet is applied, some parts of said faucet being broken away and sectioned and other parts thereof being shown in different positions by means of broken lines;

Fig. 2 is a view partly in elevation and partly in transverse vertical section taken on the line 2—2 of Fig. 1;

Fig. 3 is a view partly in elevation and partly in transverse vertical section taken on the line 3—3 of Fig. 1 and further illustrating an actuating bail;

Fig. 4 is a perspective view of the valve plate and its operating arm removed from the faucet; and Fig. 5 is a perspective view of the operating bail removed from the faucet.

The numeral 6 indicates a coffee urn to which the improved faucet is attached. Said faucet comprises a horizontally extended cylindrical body 7, the outer end of which is normally closed by a screw plug 8. Formed with the body 7 near the outer end thereof is a depending nozzle 9 the discharge passageway 10 in which is slightly upwardly and rearwardly inclined. This discharge passageway 10 at its lower end is circumferentially expanded to form an internal valve seat 11 as well as clearance for a valve plate 12 that is mounted for hinge-like movement to open and close said passageway 10. Said valve plate 12 is formed on the free end of the short arm of a U-shaped arm 13 mounted on a horizontal hinge pin 14 for vertical swinging movement. A set screw 15 rigidly but adjustably secures the arm 13 to the hinge pin 14 for movement about the axis thereof.

The horizontal or intermediate portion of the arm 13 works in a notch 16 formed in the lower end of the nozzle 9 at the back thereof so that said arm may be made relatively short and with its horizontal portion substantially within the nozzle 9 when the valve plate 12 is closed. The hinge pin 14 is turnably mounted in a pair of axially spaced hinge lugs 17 on the body 7 and between which lugs the arm 13 extends and is held thereby against lateral shifting movement. A washer 18 of babbitt or other suitable material is detachably secured by a screw 19 to the valve plate 12 and normally engages the valve seat 11 to close the passageway 10 with a tight joint. It is important to note that the valve seat 11 and valve plate 12 are in forwardly and downwardly inclined positions and lie in planes that extend substantially radially from the axis of the hinge pin 14.

For operating the arm 13 to open or close the valve plate 12 there is provided an upstanding forwardly inclined handle 20 positioned directly over the body 7 and secured to a fork 21, the prongs of which straddle said body and have their outer end portions mounted on the projecting ends of the hinge pin 14 and are rigidly secured thereto by keys 22 for common movement therewith.

The valve plate 12 is yieldingly held closed, with its washer 18 tightly pressed against the valve seat 11, by a spring 23 comprising a pair of coils encircling the hinge lugs 17 an intermediate portion extending transversely under the body 7 and engaging the same as a base of resistance and a pair of arms attached to the prongs of the fork 21 and under strain to move the handle 20 rearward and hold the arm 13 in a position in which the valve plate 12 is closed.

A depending bail 24 is attached to the hinge pin 14 and held by the keys 22 for common turning movement therewith. This bail 24 is arranged to be engaged by a cup, not shown, when held under the nozzle 9 and operated to open the valve plate 12 by pressure applied to said cup in a direction to force the same against said bail.

The customary glass gauge 25, commonly used in connection with coffee urns, is mounted on the body 7 and has communication with the passageway therein by a valve controlled connection 26.

When the valve plate 12 is opened by either the handle 20 or bail 24 it will internally engage the nozzle 9 as a stop to limit the opening movement thereof and will be automatically closed by the spring 23 when the pressure on said handle or bail is removed. The arrangement of the arm 13 and the mounting of the valve plate 12 thereon are such that very little movement of the handle 20 or bail 24 is required to open the valve plate 12 to the full conducting capacity of the passageway 10 thus making it possible to very quickly fill a cup with coffee from the urn 6.

In case any of the coffee remains on the valve plate 12 or arm 13 after said plate is closed, it will quickly drain therefrom before the cup can be removed due to the oblique position in which the valve plate 12 and transverse portion of the arm 13 are held and the sharp elbow on the arm. This elbow, as will be noted, terminates in a relatively sharp point at the junction of the horizontal and short upright sections of the arm 13. The horizontal portion of the arm 13 when the valve plate 12 is open is in a downwardly and outwardly inclined position.

By mounting the valve plate 12 to open with a hinge action, very little wear is produced on said plate and its seat 11 thus preventing the faucet from dripping or leaking. The tension of the spring 23 may be varied at will by loosening the set screw 15 and moving the handle 20 either forward or backward on the axis of the hinge pin 14. The horizontal passageway in the faucet may be easily and quickly cleaned by removing the screw plug 8 and inserting a brush therethrough and the passageway 10 may be likewise cleaned when the valve is open to its full extent, as indicated by broken lines in Fig. 1.

What I claim is:

1. A faucet comprising a body having a nozzle provided with an internal valve seat that is oblique to a horizontal plane, a substantially U-shaped arm, one end of which is hinged to the body above the valve seat, a valve member on the other end of the arm, said valve seat and valve member being in planes that extend substantially radially from the axis of the hinged end of the arm and radially spaced therefrom, a spring normally holding the arm in a position in which the valve member engages the valve seat and closes the nozzle, and an operating connection for the arm.

2. The structure defined in claim 1 in which the transverse portion of the arm is in a downwardly inclined position when the valve member is open.

3. A faucet comprising a body having a nozzle provided with an internal valve seat that is oblique to a horizontal plane, a hinge pin turnably mounted on the body, an arm and an operating connection therefor, said arm and connection being mounted on the hinge pin for common movement therewith, a valve member on the arm, and a spring normally holding the arm with the valve member on the valve seat to close the nozzle, said arm being adjustable about the axis of the hinge pin and in respect to the operating connection therefor to vary the tension of the spring.

4. The structure defined in claim 3 in further combination with a cup engageable member fixed on the hinge pin.

5. A faucet comprising a body having a nozzle, the outer end portion of the passage of which is circumferentially expanded to form a valve seat that is oblique to a horizontal plane, a valve member hinged in respect to the body substantially in the plane of the valve seat, a spring normally holding the valve member on the valve seat to close the nozzle, and an operating connection for the valve member.

6. A faucet comprising a body having a nozzle the delivery end portion of its passageway being expanded and provided with an internal valve seat that is oblique to a horizontal plane, an arm hinged in respect to said body outward of said passageway substantially in the plane of the valve seat and with its free end projecting into the nozzle, a valve member on the free end of the arm within the nozzle, a spring normally holding the arm in a position in which the valve member engages the valve seat and closes the nozzle, and an operating connection for the arm.

7. The structure defined in claim 6 in which the nozzle is provided with an internal stop surface arranged to limit the opening movement of the valve member.

In testimony whereof I affix my signature.

ALBERT SLATEN.